United States Patent [19]
Trimmer et al.

[11] Patent Number: 5,886,130
[45] Date of Patent: Mar. 23, 1999

[54] POLYPHENYLENE CO-POLYMERS

[75] Inventors: Mark S. Trimmer, Monrovia; Ying Wang, Diamond Bar; Matthew L. Marrocco III, Santa Ana; Virgil J. Lee, La Verne, all of Calif.

[73] Assignee: Maxdem Incorporated, San Dimas, Calif.

[21] Appl. No.: 552,127

[22] Filed: Nov. 2, 1995

[51] Int. Cl.$^6$ .................................................. C08G 75/00
[52] U.S. Cl. ........................... 528/171; 528/381; 528/388; 528/403; 528/183; 528/397; 528/434; 528/420; 528/436; 528/353; 528/348; 528/341; 528/206; 528/208; 528/210; 528/211; 528/219; 525/420; 525/436; 525/534
[58] Field of Search ..................... 528/381, 388, 528/403, 171, 183, 397, 434, 420, 436, 353, 348, 341, 206, 208, 210, 211, 219; 525/436, 420, 534

[56] References Cited

U.S. PATENT DOCUMENTS

| | | | |
|---|---|---|---|
| 3,431,221 | 3/1969 | Hoess | 260/2 |
| 3,582,498 | 6/1971 | Bilow et al. | 260/2 |
| 3,595,811 | 7/1971 | Bilow | 260/2 |
| 3,756,982 | 9/1973 | Korshak | 260/41 |
| 3,826,783 | 7/1974 | Bloch | 260/47 |
| 3,998,864 | 12/1976 | Trevillyan | 260/439 |
| 4,108,835 | 8/1978 | Arnold et al. | 528/183 |
| 4,108,942 | 8/1978 | Chalk et al. | 260/875 |
| 4,207,407 | 6/1980 | Helminiak et al. | 525/425 |
| 4,263,466 | 4/1981 | Colon et al. | 585/421 |
| 4,284,834 | 8/1981 | Austin et al. | 585/25 |
| 4,326,989 | 4/1982 | Colon et al. | 252/429 |
| 4,377,546 | 3/1983 | Helminiak et al. | 264/232 |
| 4,384,107 | 5/1983 | Rogers et al. | 528/183 |
| 4,393,194 | 7/1983 | Guadiana et al. | 528/348 |
| 4,400,499 | 8/1983 | Colon | 528/284 |
| 4,433,132 | 2/1984 | Rogers et al. | 528/191 |
| 4,454,307 | 6/1984 | Cheshire | 525/379 |
| 4,461,886 | 7/1984 | Rogers et al. | 528/331 |
| 4,486,576 | 12/1984 | Colon et al. | 525/471 |
| 4,503,248 | 3/1985 | Guadiana et al. | 564/307 |
| 4,520,189 | 5/1985 | Rogers et al. | 528/331 |
| 4,525,413 | 6/1985 | Rogers et al. | 428/212 |
| 4,608,429 | 8/1986 | Rogers et al. | 528/194 |
| 4,628,125 | 12/1986 | Rogers et al. | 568/730 |
| 4,629,777 | 12/1986 | Pfeifer | 528/353 |
| 5,102,971 | 4/1992 | Himmler et al. | 528/167 |
| 5,169,929 | 12/1992 | Tour et al. | 528/397 |
| 5,227,457 | 7/1993 | Marrocco, III et al. | 525/534 |

FOREIGN PATENT DOCUMENTS

| | | | |
|---|---|---|---|
| 1129418 | 8/1982 | Canada | 260/279.6 |
| 130056 | 2/1985 | European Pat. Off. | |
| 0436111 | 11/1990 | European Pat. Off. | |
| 3821567 | 12/1989 | Germany | |
| 928576 | 6/1963 | United Kingdom | |
| 91/02764 | 8/1980 | WIPO | |
| 89/07617 | 1/1989 | WIPO | |
| WO92/17516 | 10/1992 | WIPO | |
| WO93/04098 | 3/1993 | WIPO | |
| WO93/18077 | 9/1993 | WIPO | |

*Primary Examiner*—Melvyn I. Marquis
*Attorney, Agent, or Firm*—Christie, Parker & Hale, LLP

[57] ABSTRACT

A new class of polyarylene co-polymers include repeating units comprising one or more arylene units having the general formula (—Ar—/—Y—)$_n$, where Y is a divalent group chosen from nil, —Z—, —Z—Ph—, and —Ph—Z—Ph—, where Z is a divalent group chosen from the group consisting of —O—, —S—, —NR—, —O(CO)—, —O(CO$_2$)—,—(CO)NH(CO)—, —NR(CO)—, phthalimide, pyromellitimide, —CO—, —SO—, —SO$_2$—, —P(O)R—, —CH$_2$—, —CF$_2$—, and —CRR'—; Ph is phenylene (ortho, meta or para); and n is greater than 4. The co-polymers are useful as molding resins, and composite matrix resins, and where Ar is heteroarylene as ion exchange resins.

41 Claims, No Drawings

POLYPHENYLENE CO-POLYMERS

FIELD OF THE INVENTION

This invention relates to polyarylene co-polymers having substituted arylene repeat units in the main chain. The polymers can be used for dielectric insulators in electrical applications, and as high temperature plastics. This invention also relates to ionic compositions comprising acids and polyarylene co-polymers having heterocyclic repeat units. The ionic compositions can be used for polymeric electrolytes.

BACKGROUND OF THE INVENTION

Polyarylenes are of interest because the basic arylene unit has excellent thermal and chemical stability. Polymers containing only phenylene units have been described. One method for their preparation is the oxidative coupling of aromatic compounds, such as benzene, as disclosed in P. Kovacic, et al., *Chem. Rev.*, 1987, 87, 357–379. This method involves a chemical oxidant such as cupric chloride and a Lewis acid catalyst, and in general results in insoluble polyphenylenes of uncertain structure. It is thought that polyphenylenes prepared by oxidation of benzene are branched and low in molecular weight.

Polyphenylenes of better defined composition have been reported by J. K. Stille, *Die Makromolekulare Chemie,* 1972, 154, 49–61. Stille found that the unsubstituted parent polyphenylene was insoluble in all solvents and did not melt. Phenyl substituted polyphenylenes, prepared by Diels-Alder cycloaddition of rather elaborate, and therefore costly, monomers, were soluble in organic solvents and could be processed into films. These phenylene substituted polyphenylenes appeared to have both para and meta catenation in the main chain, although the ratios of para and meta could only be inferred from the study of model compounds.

Substituted polyphenylenes have been disclosed by M. L. Marrocco, et al., in U.S. Pat. No. 5,227,457. Marrocco, et al., disclose rigid-rod (i.e. predominately 1,4 or para linked) polyphenylenes made soluble by the attachment of organic side groups. The side groups are chosen for a positive interaction with solvent, but are electrically neutral (uncharged) groups.

The chemical and physical properties, including thermal stability, glass transition temperature ($T_g$), and dielectric constant (K), of substituted polyphenylenes depends on the solubilizing groups and the structure of the polymer backbone. It would be desirable to find polyphenylenes having lower K and higher $T_g$, while maintaining good solubility and processability. It would also be desirable to provide polyphenylene compositions having well defined structures and high purity that may be produced from relatively low cost starting materials.

SUMMARY OF THE INVENTION

Co-polymers are provided in accordance with practice of the present invention which include repeat units comprising arylene aromatic nuclei at least some of which are substituted with pendant organic groups. The aromatic nucleus is linked into the polymer backbone through the meta (1,3) or para (1,4) positions, and may be a phenylene nucleus or a heteroaromatic nucleus having one, two, or three of the CH groups of the ring replaced with N. With one CH group substituted with N the aromatic nucleus is a pyridine nucleus, with two N the aromatic nucleus is a pyrizine, pyrimidine, or pyridazine nucleus, with three N the aromatic nucleus is a triazine nucleus.

DETAILED DESCRIPTION OF THE INVENTION

The co-polymer of the present invention comprises the general structural formula:

   (1)

where —Ar— is one or more types of arylene or heteroarylene repeat units selected from

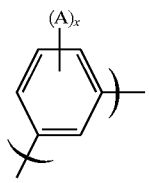

and

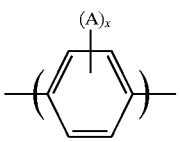

where
one to three of the aromatic CH groups may be optionally replaced with N;
at least 0.1 mol % and preferably at least 1 mol % of the repeat units in (1) are —Ar—;
the number average segment length of the arylene segments is greater than 2, preferably greater than 3, more preferably greater than 4, the number average segment length of para-arylene repeat units, if present, is between 1 and about 8; the number average segment length of meta-arylene repeat units, if present, is greater than 1;
x is 0–4, and the pendant groups (A) are chosen independently from the group consisting of —F, —CN, —CHO, —COR, —CR=NR', —OR, —SR, —SO$_2$R, —OCOR, —CO$_2$R, —NRR', —N=CRR', —NRCOR', —CONRR', and R, where R and R' are selected independently from the group consisting of H, alkyl, substituted alkyl, aryl, substituted aryl, heteroaryl and substituted heteroaryl, and R and R' taken together may be bridging;
Y is a divalent group chosen from nil, —Z—, —Z—Ph—, and —Ph—Z—Ph—, where Z is a divalent group chosen from the group consisting of —O—, —S—, —NR—, —O(CO)—, —O(CO$_2$)—, —(CO)NH(CO)—, —NR(CO)—, phthalimide, pyromellitimide, —CO—, —SO—, —SO$_2$—, —P(O)R—, —CH$_2$—, —CF$_2$—, and —CRR'—;
Ph is phenylene (ortho, meta or para); and where Y is nil, there are at least two substitutionally or isomerically different types of —Ar— repeat unit; and where at least 1 of every 100 repeat units, preferably at least 1 of every 10 repeat units, more preferably at least 1 of every 5 repeat units and most preferably at least 1 of every 2 repeat units has a pendent side group A; and n is greater than about 4, preferably about 10 to 10,000, more preferably about 20 to 1,000, and most preferably about 50 to 500, and represents the number average degree of polymerization;
More than one —Ar— type or —Y— type repeat unit may be present. Non-limiting examples of co-polymers are then (—Ar—/—Ar'—/—Y—), (—Ar—/—Ar'—/—Ar"—/—Y—), (—Ar—/—Y—Y'—), and the like.

Two adjacent pendant groups A may be bridging. Non-limiting examples of bridging groups include:

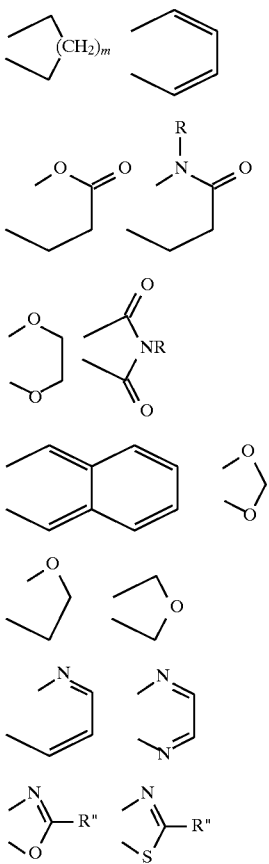

where R" is H, alkyl, aryl, —OH, —NH$_2$, —SH, alkoxy, aryloxy, thioalkyl, thioaryl, substituted alkyl and substituted aryl.

Examples of alkyl groups —R useful in the practice of the present invention include, but are not limited to, methyl, ethyl, propyl, n-butyl, t-butyl, dodecanyl, trifluoromethyl, perfluoro-n-butyl, 2,2,2-trifluoroethyl, benzyl, 2-phenoxyethyl and the like.

Examples of aryl groups —R useful in the practice of the present invention include, but are not limited to, phenyl, 2-tolyl, 3-tolyl, 4-tolyl, naphthyl, biphenyl, 4-phenoxyphenyl, 4-fluorophenyl, 3-carbomethoxyphenyl, 4-carbomethoxyphenyl and the like.

Examples of alkoxy groups —OR useful in the practice of the present invention include, but are not limited to, methoxy, ethoxy, 2-methoxyethoxy, t-butoxy and the like.

Examples of aryloxy groups —OR useful in the practice of the present invention include, but are not limited to, phenoxy, naphthoxy, phenylphenoxy, 4-methylphenoxy and the like.

Examples of ketone groups —COR useful in the practice of the present invention include, but are not limited to, acetyl, propionyl, t-butylcarbonyl, 2-ethylhexylcarbonyl, phenylcarbonyl (benzoyl), phenoxyphenylcarbonyl, 1-naphthylcarbonyl, 2-naphthylcarbonyl, nicotinoyl, isonicotinoyl, 4-methylphenylcarbonyl, 2-fluorophenylcarbonyl, 3-fluorophenylcarbonyl, 4-fluorophenylcarbonyl, and the like.

Examples of amine groups —NRR' useful in the practice of the present invention include, but are not limited to, amino, dimethylamino, methylamino, methylphenylamino, phenylamino, and the like.

Examples of imine groups —N=CRR' useful in the practice of the present invention include, but are not limited to, dimethyl imino (R=R'=methyl), methyl imino(R=H, R'=methyl), phenyl imino (R=H, R'=phenyl), and the like.

Examples of imine groups —CR=NR' useful in the practice of the present invention include, but are not limited to, phenyl-N-methylimino, methyl-N-methylimino, phenyl-N-phenylimino, and the like.

Examples of amide groups —CONRR' useful in the practice of the present invention include, but are not limited to, N,N-dimethylaminocarbonyl, N-butylaminocarbonyl, N-phenylaminocarbonyl, N,N-diphenylaminocarbonyl, N-phenyl-N-methylaminocarbonyl, and the like.

Examples of amide groups —NRCOR' useful in the practice of the present invention include, but are not limited to, N-acetylamino, N-acetylmethylamino, N-benzoylamino, N-benzoylmethylamino, and the like.

Examples of ester groups —CO$_2$R useful in the practice of the present invention include, but are not limited to, methoxycarbonyl, benzoyloxycarbonyl, phenoxycarbonyl, naphthyloxycarbonyl, ethylcarboxy, and the like.

Examples of ester groups —OCOR useful in the practice of the present invention include, but are not limited to, phenylcarboxy, 4-fluorophenylcarboxy, 2-ethylphenylcarboxy, and the like.

Examples of thioether groups —SR useful in the practice of the present invention include, but are not limited to, thiomethyl, thiobutyl, thiophenyl, and the like.

Examples of sulfonyl groups —SO$_2$R useful in the practice of the present invention include, but are not limited to, methylsulfonyl, ethylsulfonyl, phenylsulfonyl, tolylsulfonyl and the like.

Examples of repeat units —Ar— useful in the practice of the present invention include, but are not limited to, phenylene (1,3-, and 1,4-), 5-amino-1,3-phenylene, 4-benzoyl-1,3-phenylene, 5-benzoyl-1,3-phenylene, 2-benzoyl-1,4-phenylene, 4,4'-bi-phenyldiyl, 2-carboxy-methyl-1,4-phenylene, 4-carboxymethyl-1,3-phenylene, 5-carboxymethyl-1,3-phenylene, 1,3-naphthalenediyl, 1,4-naphthalenediyl, 5-phenoxy-1,3-phenylene, 2-phenyl-1,3-phenylene, 4-phenyl-,3-phenylene, 5-phenyl-1,3-phenylene, 2-phenyl-1,4-phenylene, 2,6-pyridinediyl, 2,4-pyridinediyl, 3,5-pyridinediyl, 3,6-pyridazinediyl, 5,8-quinolinediyl, 2,4-toluenediyl, 2,5-xylenediyl, and the like. Other 1,3 and 1,4 positional isomers of the above arylene groups not specifically listed may be —Ar—, e.g. 2,4-quinolinediyl, 2,5-quinolinediyl, 2,6-quinolinediyl, and the like. One skilled in the art will be able to recognize other Ar nuclei suitable for use in the present invention.

Preferred examples of Z include but are not limited to those derived from bis-phenol A, bis-phenol AF, and other bis phenols, such that Z is -oxy-1,4-phenylene-2,2-isopropylidene-1,4-phenylene-oxy-; -oxy-4,4'-diphenylmethane-oxy; -oxy-1,4-phenylene-2,2-hexafluoroisopropylidene-1,4-phenylene-oxy-; -carbonyloxy-1,4-phenylene-2,2-isopropylidene 1,4-phenylene-oxycarbonyl-; and the like. Additional preferred examples of Z include: -hexafluoroisopropylidene-2,2-diyl; -isopropylidene-2,2-diyl-; 2-phenyl-1,1,1-trifluoroethyliden-2,2'-diyl, and the like.

Preferred examples of ester and amide type —Ph—Z—Ph— include: -(phenylene-CONH-phenylene-NHCO)-phenylene, -(phenylene-CONH-phenylene)-, -(phenylene-COO-phenylene-OCO)-phenylene-, -(phenylene-carbonyl)-phenylene-, -(phenylene-carbonyl-phenylene-oxo-phenylene-carbonyl-phenylene)- and the like.

Where the polymer of the present invention is a block co-polymer and Y is not nil the repeat units Y may form oligomeric or polymeric segments, non-limiting examples of which are polyamide, polyarylate, polyaryleneoxide, polycarbonate, polydimethylsiloxane, polyester, polyetherketone, polyphenylene, substituted polyphenylene, polyphenylenesulfide, polystyrene, and the like.

Preferred Y units forming a block are selected from the group consisting of -(phenylene-CONH-phenylene-NHCO)$_m$-phenylene, -(phenylene-CONH)$_m$-phenylene-, -(phenylene-COO-phenylene-OCO)$_m$-phenylene-, -(phenylene-carbonyl)$_m$-phenylene-, and -(phenylene-carbonate-phenylene-2,2-isopropylidene-carbonate)$_m$-phenylene-.

Polyaryleneoxide is meant here to be a generic name for polymers of the type (—Ar—O—)$_n$. Polyaryleneoxides include, but are not limited to, poly(2,6-dimethyl-1,4-phenyleneoxide), poly(2,6-diphenyl-1,4-phenyleneoxide), poly(oxy-2,3, 5,6-tetrafluorophenylene), and poly(oxy-2,6-pyridinediyl). Polyetherketone is meant here to be generic for the various polymers comprised of phenylene, oxo, and carbonyl repeat units, including but not limited to poly(oxy-1,4-phenylene-oxy-1,4-phenylene-carbonyl-1,4-phenylene), also known as PEEK for polyether ether ketone, and the related polymers PEK, PEKK, and the like. Polyarylate is meant here to be a generic name for the various polymers formed from terephthalic acid or isophthalic acid and diols such as bis-phenol A (2,2'-isopropylidenediphenol), resorcinol, hydroquinone, 4,4'-dihydroxybipyhenyl and the like. The above generic names will be known to those skilled in the art.

Polyamide includes but is not limited to polymers formed from the formal condensation of diamines such as 1,4-butane diamine, 1,6-hexane diamine, 4,4'-methylenedianiline, 1,3-phenylenediamine, 1,4-phenylenediamine, and the like, with diacids such as adipic acid, isophthalic acid, terephthalic acid, succinic acid, and the like.

Polyester includes but is not limited to polymer formed by the formal condensation of diols such as ethylene glycol, 1,6-hexane glycol, hydroquinone, propylene glycol, resorcinol, and the like, with diacids such as adipic acid, isophthalic acid, terephthalic acid, sacinic acid, and the like.

The polymers of the present invention as shown in structure (1) may be random or block co-polymers. The slash (/) in polymer structure (1) and throughout below, implies the most general arrangement of repeat units, encompassing random, block, or other co-polymer types. The polymers of the present invention may also have a structure intermediate between fully random and regular block, referred to as partial block, or blocky co-polymers. The method of preparation and degree of reactivity of the various monomers will determine the degree of blockiness, and those skilled in the art will be aware of the various methods to control the blockiness of the product polymer.

The polymers of the present invention may have end groups derived from the monomers, or from specific end-cappers added during the polymerization reaction. The end groups may also be further modified by chemical transformation, such as removal of a protecting group, or reaction in a post-polymerization step. The end groups may be used to form block co-polymers with other monomers or polymers, or as crosslinking groups in a curing process.

In one embodiment the polymers of the present invention are co-polymers of meta-phenylene and para-phenylene units, having the general structure:

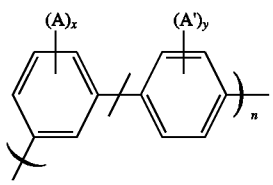

In this embodiment Y is nil, and the segment length of arylene segments is equal to n since all of the segments are arylene.

Where the co-poly(meta-phenylene-/-para-phenylene) is a block co-polymer the general formula may be written:

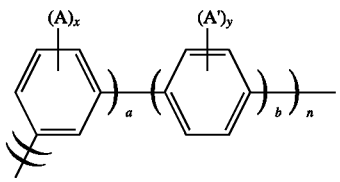

where a is the number average length of the meta-phenylene block, b is the number average length of the para-phenylene block, and n is the number average number of blocks per chain. Co-polymers of this type have a greater than 1, and b between 1 and about 8. Where b is greater than about 8 the polymers are essentially rigid-rod type polymers and have qualitatively different behavior than normal flexible polymers. Rigid-rod polymers and flexible polymers are typically treated as separate classes of polymers, even where the repeat unit compositions are similar. In particular, rigid-rod polymers have extremely high viscosity in the melt and in solution, and have very high tensile moduli. Because they have unusually high viscosity rigid-rod polymers are difficult to process, and purify. The polymers of the present invention are at most semi-rigid and do not have the extremely high viscosity characteristic of rigid-rod polymers. The polymers of the present invention are therefore more soluble, and have higher melt flow than rigid-rod polyphenylenes, however, the polymers of the present invention do have the chemical and thermal stability of polyphenylenes, and for suitably chosen side groups low K and low water absorption.

It has been found that, to reduce K and moisture uptake to the lowest possible values, while maintaining processability, it is desirable to reduce the number and polarity of side groups A as much as possible. For rigid-rod type polyphenylenes it is not possible to eliminate many side groups without lowering solubility to impractical levels. It has been found that, by introducing flexible phenylene repeat units, specifically meta-phenylene repeat units, solubility and processability can be maintained with fewer solubilizing side groups. It is, therefore, preferred that meta-phenylene repeat units comprise at least about 10%, preferably at least about 20%, and more preferably at least about 30% and even more preferably, at least about 40% of the total repeat units. Soluble co-polymers are possible where only one of two monomer types has pendant side groups.

Where side groups A are appended only to the para-phenylene repeat units the polymers of the present invention have following general structure:

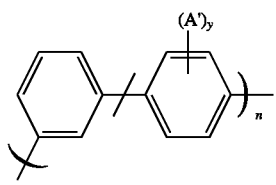

And the following structures illustrate the case wherein each repeat unit has at most one side group A:

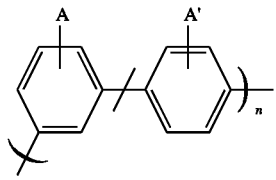

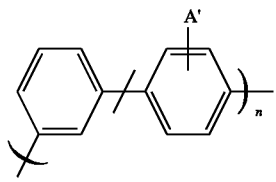

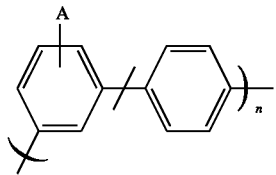

In another embodiment of the present invention the copolymer comprises two differently substituted meta-phenylene repeat units and the general formula is:

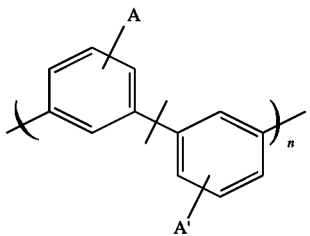

In another embodiment the co-polymers of the present invention have the structure:

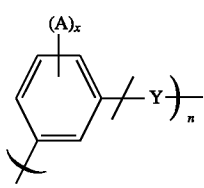 (2)

The general structure below indicates a mol percent of —Ar— repeat units of 80% and —Y— repeat units 20%, and as above the sequence (random, block, etc.) is not implied.

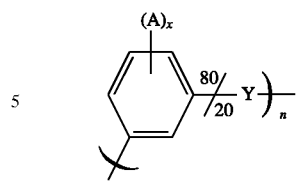

The specific structure below shows a random co-polymer of benzoyl appended 1,4-phenylene (15 mol % of the repeat units) and 1,3-phenylene (85 mol % of the repeat units).

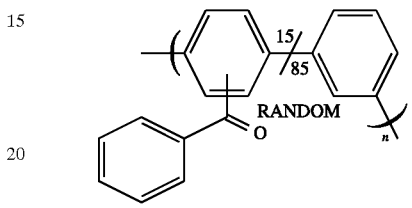

Additional specific structures below are non-limiting examples of polymers of the present invention.

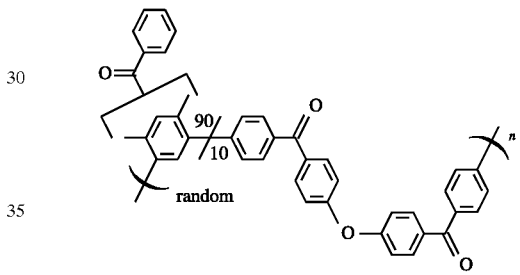

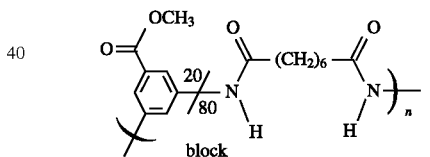

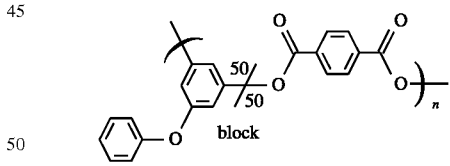

In the first formula above, the benzoyl group is randomly substituted between the ortho and para positions relative to catenation.

The polymers of the present invention may be prepared from monomers selected from the following group:

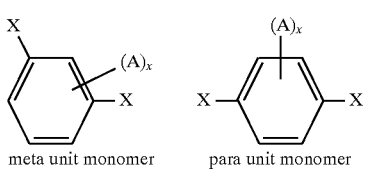

meta unit monomer     para unit monomer

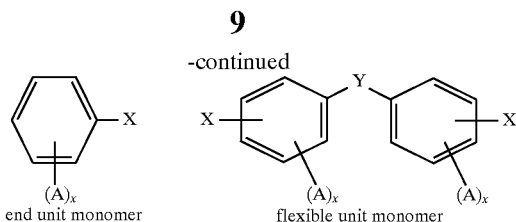

end unit monomer     flexible unit monomer where X is chloro, bromo, iodo, or a sulfonate, preferably chloro.

Examples of sulfonate useful in the practice of the present invention include, but are not limited to, methane sulfonate, phenyl sulfonate, toluene sulfonate, trifluoromethane sulfonate, and fluorosulfonate.

The repeat units —Ar— and —Y— may be derived from the corresponding dihalo, disulfonato, or halosulfonato monomer. For example, 1,4-phenylene from 1,4-dichlorobenzene, 2-benzoyl-1,4-phenylene from 2,5-dichlorobenzophenone or 5-chloro-2-sulfonoxymethylbenzophenone, and 5,8-quinolinediyl from 5,8-dichloroquinoline.

Where Y is —Ph—Z—Ph— and Z is amide, ester, imide and the like, the monomer X—Y—X may be derived from a haloaryl acid, such as chlorobenzoic acid, and a diamine or diol such as resorcinol, 1,4-butane diol, hexamethylene diamine, and 1,4-phenylene diamine, or a haloarylamine or haloarylalcohol such as meta-chloroaniline and meta-chlorophenol. Similarly, monomers may be derived from condensation of haloarylamines or haloarylalcohols with diacids such as adipic acid or terephthalic acid. Where Y is oligomeric or polymeric the Y segments may be derived from condensation of a haloaryl acid, with a diacid and a diamine to form a haloaryl endcapped polyamide, or from a haloaryl acid with a diacid and a diol to form a haloarylene endcapped polyester. Other X—Y—X type monomers may be prepared similarly by including haloaryl type endcappers into a condensation or addition polymerization.

The above monomers may be polymerized to form the polymers of the present invention by reductive coupling using nickel (0) compounds as described by T. Kanbara, T. Kushida, N., Saito, I. Kuwajima, K. Kubota, and T. Yamamoto, *Chemistry Letters,* 1992, 583–586, or nickel catalyzed reductive coupling as described in '457 or U.S. Pat. No. 5,241,044.

The polymers of the present invention may also be prepared y the reaction of dimeric, oligomeric, polymeric, or co-polymeric compounds having the formula:

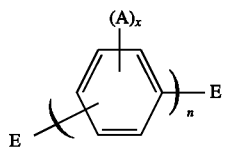

with a complementary difunctional monomer, oligomer, polymer, or co-polymer having the formula:

E'—(—Y—)$_m$—E' where E and E' are complementary reactive groups. General formulas for co-polymeric compounds having reactive groups E are E—(—Ar—/—Ar'—)—E, and E—(—Ar—/—Ar'—/—Ar'''—)—E, E'—(—Y—/—Y'—)—E' and the like.

Complementary reactive groups E and E' may be chosen for example from the same row in Table 1.

TABLE 1

| E | E' |
|---|---|
| —ArCO$_2$H, —CO$_2$H, —ArCOCl, —COCl | —OH, —NH$_2$ |
| —ArOH, —OH | —CO$_2$H, —COCl, —CNO |
| —ArNH$_2$, —NH$_2$ | —CHCH$_2$O, SiRR'Cl |
| —ArF, F | —OH |

Thus, if E is —ArCO$_2$H and E' is —OH the polymer will be a polyester. Where E is —F or —ArF the fluoro group must be activated towards nucleophilic displacement by an electron withdrawing group on the same ring. Non-limiting examples of activating electron withdrawing groups are benzoyl, phenylsulfonyl, 2-benzoxazolyl, 2-quinolineyl, and 4-quinolineyl.

The following reaction illustrates the formation of a block co-polymer from E—Ar—E and E'—Y—E':

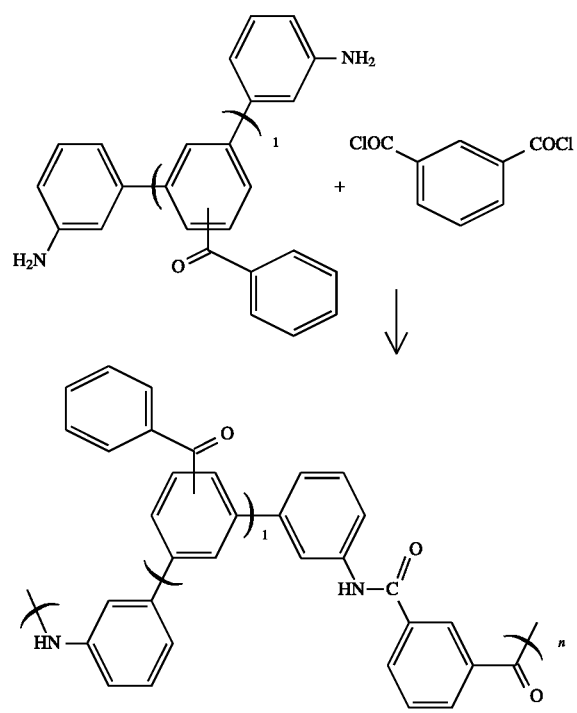

The following reaction illustrates the case wherein a co-polymer of the present invention is prepared from an E—Ar—E block and two monomers of type E—Ph—E and E'—Ph—E' which form the —Y— block.

Scheme 1

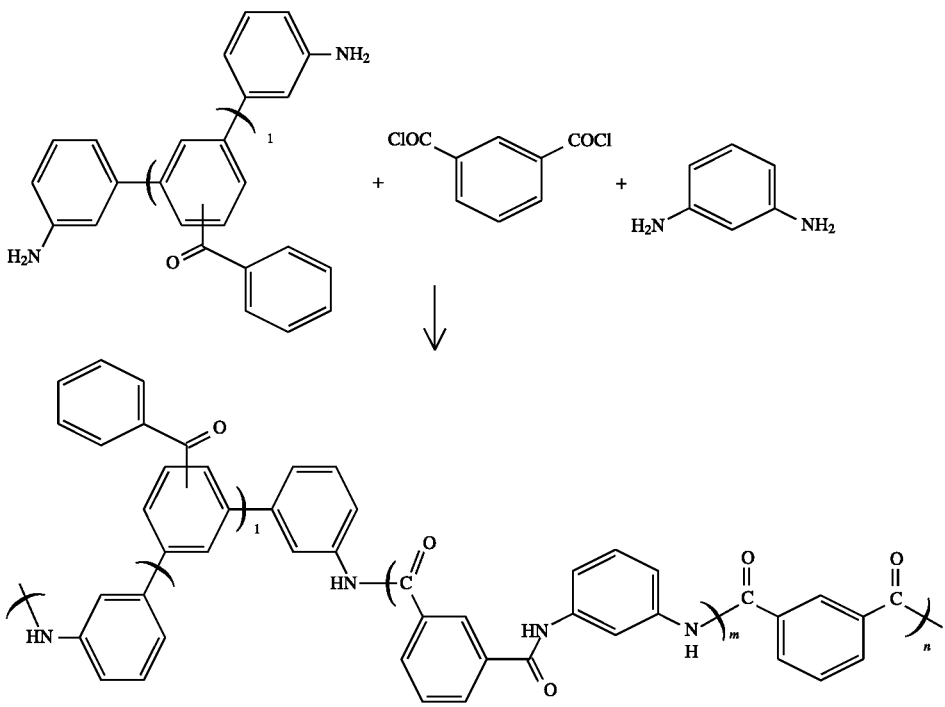

Where —((Ar)$_1$(Y)$_m$)$_n$— is prepared from E—(Ar)$_1$—E and E'—Y—E' there may be additional linking groups derived from E and E' or there may be an additional fractional part of the repeat unit Y. These are not listed explicitly in the formula —((Ar)$_1$(Y)$_m$)$_n$—. For example, in Scheme 1 above there is an additional isophthaloyl unit (a part of the Y repeat unit) and two additional amino-1,3-phenylene units (derived from the E groups). The product polymer of Scheme 1 is considered to have Y equal to poly(isophthalamido-1,3-phenylene).

Other E and E' will be apparent to those skilled in the art. The general requirements are that E not interfere with the formation of the reactive oligomer E—(Ar)—E, and that E and E' are suitably reactive. The usual protective groups may be used in the preparation of E—(Ar)—E, including but not limited to alkyl ethers, tetrahydropyranyl ethers, 2-alkoxyisopropylidene ethers, esters, amides, t-butylcarbonate, trialkylsilyl groups, and the like.

About 0.1 mol percent Y can have an observable effect on polymer properties, for example, altering melt flow or $T_g$, both of which are of practical importance. As little as 0.1 mol percent meta arylene repeat unit will significantly affect the overall polymer properties. However, for many practical applications it will be desirable to have more than 0.1%, and preferably about 1% or more meta arylene repeat unit. For example, a polymer where 1% of the repeat units are meta arylene units will have different mechanical properties than a polymer with no meta arylene repeat units. Although polymer properties are more closely related to weight percent Y than mol percent Y, the limits of about 0.1 mol percent and 99 mol percent are convenient and sufficient for the purposes of the present invention.

The solubility of polymers is in general increased by introducing irregularities into the polymer chain. Since polyarylenes are generally poorly soluble polymers it is an advantage to prepare co-polymers of polyarylenes. Polyarylene co-polymers may have more than one type of arylene repeat unit, either differently substituted (i.e., different A pendant groups) or differently catenated (i.e., meta and para). Polyarylene co-polymers may also have repeat units other than arylene. The incorporation of more than one type of repeat unit increases the disorder of the polymer chain and thereby increases the solubility. The side groups A of the polymers of the present invention serve to increase the solubility of the polyarylene backbone. Unsubstituted polyarylenes, including poly(1,4-phenylene), poly(1,3-phenylene), and poly(1,4-phenylene-co-1,3-phenylene) are all highly insoluble in common organic solvents, with solubility dropping rapidly with increasing MW. Only very low MW unsubstituted polyarylenes can be prepared, because the growing polymers precipitate out of solution, and once precipitated can no longer grow.

Side groups increase solubility by increasing the entropy of the polymer chain, that is by allowing additional possible conformations in solution. The more flexible the side group the more it will contribute to the polymer solubility. Flexible side groups, however, also lower the $T_g$, lower the modulus, and increase the coefficient of thermal expansion (CTE) of the polymer, and therefore are undesirable in many applications such as printed wiring boards and composite aircraft wing structures where high $T_g$, high modulus, and low CTE are required.

Polymers having side groups which are placed randomly along the polymer chain will have higher solubility than polymers with side groups regularly placed along the chain. Therefore random co-polymers with different side groups and homopolymers with random regiochemistry (i.e. not all head-to-head or head-to-tail) will be more soluble than for example head-to-head homopolymers. The side groups of the present invention are preferably randomly or partly randomly distributed among the possible positions on the polymer backbone.

Polyarylenes are insoluble partly because they pack very well in the solid state. Side groups that disrupt packing of the polymer will increase solubility. Side groups are preferably placed ortho to the site of catenation. Groups ortho to the site of catenation have a large steric repulsion for the adjacent monomer unit. This steric repulsion causes a twisting of the adjacent repeat units out of a common plane, thereby reducing the efficiency of packing in the solid state and increasing solubility. If adjacent repeat units both have heterocyclic side groups in the ortho positions (e.g. heterocyclic groups in the 2 and 2' positions relative to the bond joining the repeat units) the steric repulsion and the twist angle will be very large, and solubility will be increased correspondingly. It is desirable that the polymers of the present invention have side groups ortho to the site of catenation. Although the polymers of the present invention need not have any ortho side groups, solubility will be improved if 5% or more of the repeat units will have ortho side groups, more preferably at least 10% of the —Ar— repeat units will have ortho side groups, even more preferably at least 25% of the —Ar— repeat units will have ortho side groups, and most preferably at least 50% of the —Ar— repeat units will have ortho side groups.

Side groups that have polarity similar to the solvent polarity typically increase the polymer solubility. Side groups that have very different polarity than the solvent may actually decrease solubility. Solvents useful for dissolving polyarylene co-polymers of the present invention include but are not limited to anisole, cresol, N-cyclohexylpyrrolidone, dichlorobenzene, dimethylsulfoxide, N,N-dimethylacetamide, N,N-dimethylformamide, formamide, N-methylacetamide, methylbenzoate, N-methylpyrrolidone, phenol, tetramethylurea, and the like.

Another advantage of a co-polymer is that some repeat units may comprise a particular chemical group useful for modifying the properties of the resultant polymer. For example, some of the repeat units may have pendant ester groups which can interact with surfaces to modify adhesion. Introduction of 10% to 20% flexible groups into an otherwise rigid-rod structure can impart higher melt flow and higher elongation to break. Co-polymer containing para-phenylene groups to increase modulus and strength, unsubstituted meta-phenylene groups to increase melt flow, and ester or amine (or other moderately reactive group) substituted phenylene groups (meta and/or para) to increase adhesion are especially useful as adhesives and as matrix resins in composites.

The co-polymers of the present invention may be used as molding compounds, either alone or with fillers, including but not limited to carbon, silica, graphite, talc, calcium carbonate, calcium sulfate, rubbers, chopped fibers, and the like. The co-polymers of the present invention may also be used as matrix resins in organic matrix composites. For example, a composite may be fabricated by coating fiber tows or fabric with the co-polymers of the present invention (known in the art as prepregging), followed by laying up the prepreg tape or fabric onto a mold, and consolidating the prepreg by application of heat and/or pressure.

The co-polymers of the present invention may be formed into fibers, film, or sheet using methods known in the art, including but not limited to melt spinning, spinning from solution, dry-jet wet spinning, extrusion, blown film extrusion, casting, and molding. The fibers, film or sheet may be further processed by drawing, stamping, forming or other techniques known in the art.

Heterocyclic repeat units are basic and may be protonated by Bronsted acids and may form complexes with Lewis acids. The relative $pK_a$s of the acid and the heterocyclic group will determine the extent of protonation. If the acid has a $pK_a$ about two units lower (more acidic) than the conjugate acid of the heterocyclic group and is present in roughly equal molar amount essentially 99% of the heterocyclic groups will be protonated. Preferably the $pK_a$ of the Bronsted acid will be no more than 2 units greater than the conjugate acid of the heterocyclic group, more preferably no more than 1 unit greater, and most preferably no greater than the conjugate acid of the heterocyclic group. One skilled in the art will be able to identify those acids which will protonate or complex a given heterocyclic group, and to calculate or measure the degree of protonation or association.

Once protonated or complexed a heterocyclic repeat unit is much more polar and therefore increases the solubility of the polymer in highly polar solvents. Polyarylenes with a substantial fraction of protonated heterocyclic repeat units will be soluble in highly polar solvents including but not limited to ethanol, methanol, and water.

Protonated polyarylenes with heterocyclic repeat units are proton exchange resins, and are useful as proton exchange membranes for fuel cells and batteries, as ion exchange membranes for deionizing salt solutions, as proton transport membranes, and as solid acid catalysts.

Polyarylenes with heterocyclic repeat units useful for protonation or complexation with Lewis acid to form ionic polymers will have heterocyclic groups with $pK_a$s of from about −1 to about 12, preferably from about 1 to 8, and most preferably from about 2 to 7. For use in non-aqueous environment $pK_a$s of less than −1 may be useful. Polymers with heterocyclic repeat units having $pK_a$s higher than 12 may be useful as anion exchange resins.

Examples of Bronsted acids useful in the practice of the present invention include, but are not limited to, acetic acid, formic acid, hydrobromic acid, hydrofluoric acid, hydrochloric acid, hydriodic acid, methanesulfonic acid, trifluoromethanesulfonic acid, tosic acid, nitric acid, percholoric acid, phosphoric acid, polyphosphoric acid, sulfuric acid, sulfurous acid, trifluoroacetic acid, and the like.

Non-limiting examples of Lewis acids useful in the practice of the present invention are aluminum tribromide, aluminum trichloride, boron tribromide, boron trichloride, boron trifluoride, cupric chloride, ferric chloride, gallium trichloride, tantalum pentafluoride, titanium tetrachloride, titanium tetrafluoride, zinc chloride, and the like.

The invention is further described below in several non-limiting and exemplary embodiments. The choices and amounts of reagents, temperatures, reaction times, are illustrative but are not considered limiting in any way. Other approaches are contemplated by and within the scope of the present invention.

EXAMPLE 1 co-polymerization of 3,5-dichloropyridine and 2,5-dichlorobenzophenone (1:1)

To a 100 ml round-bottom flask kept under nitrogen were added bis(triphenylphosphine)nickel chloride (0.535 g, 0.818 mmol), sodium iodide (0.66 g, 4.4 mmol), triphenylphosphine (3.11 g, 11.9 mmol), 2,5-dichlorobenzophenone (5.65 g, 22.5 mmol), 3,5-dichloropyridine (3.33 g, 22.5 mmol), Anhydrous N-methylpyrrolidinone (55 ml) and activated zinc dust (4.28 g, 65.5 mmol). The mixture was stirred at 60° C. overnight and filtered through a 10 micron polypropylene filter. The dope was then coagulated in 300 ml of ethanol and filtered.

The resulting polymer was treated with ethanol containing 5% HCl, filtered and washed with ethanol and acetone thoroughly. The polymer was then treated with 10 ml of ethanol containing 1 ml of triethylamine, filtered and dried to give 5.2 g product.

EXAMPLE 2

Co-polymerization of 3,5-dichloropyridine and 2,5-dichlorobenzophenone (3:2)

To a 100 ml round-bottom flask kept under nitrogen were added bis(triphenylphosphine)nickel chloride (0.535 g, 0.818 mmol), sodium iodide (0.66 g, 4.4 mmol), triphenylphosphine (3.11 g, 11.9 mmol), 2,5-dichlorobenzophenone (4.52 g, 18 mmol), 3,5-dichloropyridine (4 g, 27 mmol), Anhydrous N-methylpyrrolidinone (55 ml) and activated zinc dust (4.28 g, 65.5 mmol). The mixture was stirred at 60° C. overnight. A solution of ethanol containing 10 ml of 36% HCl was added to the mixture. After overnight stirring, the mixture was poured into 100 ml of ethanol, filtered and washed with ethanol and acetone thoroughly. The filtered solid was stirred with 20 ml of ethanol containing 3 ml of triethylamine and filtered. The cake was washed with ethanol and acetone and dried at 120° C. overnight under vacuum to give 5.87 g of product.

EXAMPLE 3

Co-polymerization of 3,5-dichloropyridine and 2,5-dichlorobenzophenone (4:1)

To a 100 ml round-bottom flask kept under nitrogen were added bis(triphenylphosphine)nickel chloride (0.535 g, 0.818 mmol), sodium iodide (0.66 g, 4.4 mmol), triphenylphosphine (3.11 g, 11.9 mmol), 2,5-dichlorobenzophenone (2.26 g, 9 mmol), 3,5-dichloropyridine (6.38 g, 36 mmol), Anhydrous N-methylpyrrolidinone (55 ml) and activated zinc dust (4.28 g, 65.5 mmol). The mixture was stirred at 60° C. overnight. A solution of ethanol containing 10 ml of 36% HCl was added to the mixture. After overnight stirring, the mixture was poured into 100 ml of ethanol, filtered and washed with ethanol thoroughly. The filtered solid was stirred with 20 ml of ethanol containing 3 ml of triethylamine and filtered. The cake was washed with ethanol and dried at 120° C. overnight under vacuum to give 4.5 g of product.

EXAMPLE 4

Co-polymerization of 3,5-dichloropyridine and 2,5-dichloro-4'-phenoxybenzophenone (4:1)

To a 100 ml round-bottom flask kept under nitrogen were added bis(triphenylphosphine)nickel chloride (0.535 g, 0.818 mmol), sodium iodide (0.66 g, 4.4 mmol), triphenylphosphine (3.11 g, 11.9 mmol), 2,5-dichloro-4'phenoxybenzophenone (2.75 g, 8 mmol), 3,5-dichloropyridine (5.33 g, 36 mmol), Anhydrous N-methylpyrrolidinone (55 ml) and activated zinc dust (4.28 g, 65.5 mmol). The mixture was stirred at 60° C. overnight. A solution of ethanol containing 10 ml of 36% HCl was added to the mixture. After overnight stirring, the mixture was poured into 100 ml of ethanol, filtered and washed with ethanol thoroughly. The filtered solid was stirred with 20 ml of ethanol containing 3 ml of triethylamine and filtered. The cake was washed with ethanol and dried at 120° C. overnight under vacuum to give 4.39 g of product.

EXAMPLE 5

Co-polymerization of 1,3-dichlorobenzene and 2,5-dichlorobenzophenone (1:1)

To a 100 ml round-bottom flask kept under nitrogen were added bis(triphenylphosphine)nickel chloride (0.727 g, 1.11 mmol), sodium iodide (0.89 g, 5.97 mmol), triphenylphosphine (3.93 g, 15 mmol), ), Anhydrous N-methylpyrrolidinone (55.6 ml) and activated zinc dust (3.68 g, 56.33 mmol). After the solution turned redish, 2,5-dichlorobenzophenone (5.02 g, 20 mmol) and 1,3-dichlorobenzene (2.94 g, 20 mmol) were added. The mixture was stirred at 65° C. overnight. Concentrated aqueous HCl(7 ml) was added carefully. The polymer solution was poured into 200 ml of ethanol and filtered. The cake was refluxed first with ethanol for 10 minutes followed by reflux in acetone for another 10 minutes and filtered and dried under vacuum to give 5 g of product.

EXAMPLE 6

Co-polymerization of 1,3-dichlorobenzene and 2,5-dichlorobenzophenone (7:3)

To a 100 ml round-bottom flask kept under nitrogen were added bis(triphenylphosphine)nickel chloride (0.727 g, 1.11 mmol), sodium iodide (0.89 g, 5.97 mmol), triphenylphosphine (3.93 g, 15 mmol), Anhydrous N-methylpyrrolidinone (55.6 ml) and activated zinc dust (3.68 g, 56.33 mmol). After the solution turned redish, 2,5-dichlorobenzophenone (3.01 g, 12 mmol) and 1,3-dichlorobenzene (4.12 g, 28 mmol) were added. The mixture was stirred at 65° C. overnight. Concentrated aqueous HCl(7 ml) was added carefully. The polymer solution was poured into 200 ml of ethanol and filtered. The cake was refluxed first with ethanol for 10 minutes followed by reflux in acetone for another 10 minutes and filtered and dried under vacuum to give 4.3 g of product.

EXAMPLE 7

Co-polymerization of 1,3-dichlorobenzene and 2,5-dichlorobenzophenone (4:1)

To a 100 ml round-bottom flask kept under nitrogen were added bis(triphenylphosphine)nickel chloride (0.393 g, 0.6 mmol), sodium iodide (0.63 g, 4.2 mmol), triphenylphosphine (2.36 g, 9 mmol), ), Anhydrous N-methylpyrrolidinone (40 ml) and activated zinc dust (4.2 g, 64.2 mmol). After the solution turned redish, 2,5-dichlorobenzophenone (2.26 g, 9 mmol) and 1,3-dichlorobenzene (5.29 g, 36 mmol) were added. The mixture was stirred at 65° C. overnight. Concentrated aqueous HCl (8 ml) was added carefully. The polymer solution was poured into 200 ml of ethanol and filtered. The cake was refluxed first with ethanol for 10 minutes followed by reflux in acetone for another 10 minutes and filtered and dried under vacuum to give 4.2 g (96%) of product.

EXAMPLE 8

Co-polymerization of 1,3-dichlorobenzene and 2,5-dichlorobenzophenone (9:1)

To a 100 ml round-bottom flask kept under nitrogen were added bis(triphenylphosphine)nickel chloride (0.727 g, 1.11 mmol), sodium iodide (0.89 g, 5.97 mmol), triphenylphosphine (3.93 g, 15 mmol), ), Anhydrous N-methylpyrrolidinone (55.6 ml) and activated zinc dust (3.68 g, 56.33 mmol). After the solution turned redish, 2,5-dichlorobenzophenone (1 g, 4 mmol) and 1,3-dichlorobenzene (5.29 g, 36 mmol) were added. The mixture was stirred at 65° C. overnight. Concentrated aqueous HCl(7 ml) was added carefully. The polymer solution was poured into 200 ml of ethanol and filtered. The cake was refluxed first with ethanol for 10 minutes followed by reflux in acetone for another 10 minutes and filtered and dried under vacuum to give 5.3 g (95%) of product.

EXAMPLE 9

Co-polymerization of 1,3-dichlorobenzene 1,4-dichlorobenzene and 2,5-dichlorobenzophenone (7:1:2)

To a 100 ml round-bottom flask kept under nitrogen were added bis(triphenylphosphine)nickel chloride (0.818 g, 1.25 mmol), sodium iodide (1.01 g, 6.71 mmol), triphenylphosphine (4.43 g, 16.9 mmol), ), Anhydrous N-methylpyrrolidinone (48 ml) and activated zinc dust (4.14 g, 63.4 mmol). After the solution turned redish, 2,5-dichlorobenzophenone (2.26 g, 9 mmol), 1,4-dichlorobenzene (0.66 g, 4.5 mmol) and 1,3-dichlorobenzene (4.63 g, 31.5 mmol) were added. The mixture was stirred at 65° C. overnight. Concentrated aqueous HCl (7 ml) was added carefully. The polymer solution was poured into 200 ml of ethanol and filtered. The cake was refluxed first with ethanol for 10 minutes followed by reflux in acetone for another 10 minutes and filtered and dried under vacuum to give 4 g (91%) of product.

EXAMPLE 10

Co-polymerization of 1,3-dichlorobenzene 1,4-dichlorobenzene and 2,5-dichlorobenzophenone (8:1:1)

To a 100 ml round-bottom flask kept under nitrogen were added bis(triphenylphosphine)nickel chloride (0.5.23 g, 0.8 mmol), sodium iodide (0.84 g, 5.6 mmol), triphenylphosphine (3.15 g, 12 mmol), ), Anhydrous N-methylpyrrolidinone (53 ml) and activated zinc dust (5.6 g, 85.6 mmol). After the solution turned redish, 2,5-dichlorobenzophenone (1.51 g, 6 mmol), 1,4-dichlorobenzene (0.88 g, 6 mmol) and 1,3-dichlorobenzene (7.06 g, 48 mmol) were added. The mixture was stirred at 65° C. overnight and coagulated in 200 ml of ethanol containing 10% aqueous HCl. The polymer was filtered, washed with hot ethanol and hot acetone thoroughly, and dried under vacuum. The yield was quantitative.

EXAMPLE 11

Copolymer of 2,5-dichlorobenzophenone (85%) and 1,3-di(4-chloro)benzoyl-benzene (15%)

A 2 l, three-necked, round-bottomed flask fitted with a nitrogen inlet valve was charged with of 10.66 g of bis(triphenylphosphine) nickel chloride, 12.97 g of sodium iodide, 53.38 g of triphenylphosphine, 54.01 g of activated zinc dust, 127.5 g of 2,5-dichlorobenzophenone, 34.69 g of 1,3-di(4-chloro)benzoylbenzene, and 815 ml of anhydrous N-methylpyrolidone (NMP). The mixture was stirred under nitrogen at 60° C. for 16 h. The polymer dope was diluted with 500 ml of NMP and was coagulated in 4.0 l of a 10% hydrogen chloride/ethanol solution, and the resulting solution was allowed to stir for 4 h. The precipitated polymer was collected by filtration and was successively boiled for 1 h in both 1.0 l of ethanol and 1.0 l of acetone. The solid was again filtered and was dried in a vacuum oven at 60° C. for 4 h and then 120° C. for 16 h (Yield=92%). $MW_w$=52,300; 5% wt. loss by TGA=418° C.; glass transition temperature=162° C.; intrinsic viscosity=0.72 (40° C./0.05M lithium bromide/NMP); flexural modulus of compression molded panel=1.10 MSI; and flexural strength of compression molded panel=12.7 KSI.

EXAMPLE 12

Copolymer of 2,5-dichlorobenzophenone (80%), 1,3-dichlorobenzene (10%), and 4,3'-dichlorobenzanilide (10%)

A 1.0 l, three-necked, round-bottomed flask fitted with a nitrogen inlet valve was charged with of 8.708 g of bis(triphenylphosphine) nickel chloride, 10.455 g of sodium iodide, 43.607 g of triphenylphosphine, 44.121 g of activated zinc dust, 98.03 g of 2,5-dichlorobenzophenone, 12.99 g of 4,3'-dichlorobenzanilide, 7.173 g of 1,3-dichlorobenzene, and 666 ml of anhydrous N-methylpyrolidone (NMP). The mixture was stirred under nitrogen at 70° C. for 16 h. The polymer dope was diluted with 500 ml of NMP and was coagulated in 4.0 l of a 10% hydrogen chloride/ethanol solution, and the resulting solution was allowed to stir for 4 h. The precipitated polymer was collected by filtration and was successively washed with 100 ml of hot ethanol and 100 ml of hot acetone. The solid was again filtered and was dried in a vacuum oven at 60° C. for 4 h and then 120° C. for 16 h (Yield=95%). $MW_w$=90,600, 5% wt. loss by TGA=470° C.; glass transition temperature=172° C.; intrinsic viscosity=1.26 (40° C./0.05M lithium bromide/NMP); flexural modulus of compression molded panel=1.20 MSI; and flexural strength of compression molded panel=40.8 KSI.

EXAMPLE 13

Copolymer of 2,5-dichlorobenzophenone (85%) and 3-chlorophenyl 4-chloro-benzoate (15%)

A 250 ml, round-bottomed flask was charged with of 2.132 g of bis(triphenylphosphine) nickel chloride, 2.56 g of sodium iodide, 10.68 g of triphenylphosphine, 10.8 g of activated zinc dust, 25.51 g of 2,5-dichlorobenzophenone, 4.788 g of 3-chlorophenyl 4-chlorobenzoate, and 64 ml of anhydrous N-methylpyrolidone (NMP). The flask was fitted with a nitrogen inlet valve and the mixture was stirred under nitrogen at 70° C. for 16 h. The polymer dope was coagulated in 400 ml of a 10% hydrogen chloride/ethanol solution, and the resulting solution was allowed to stir for 4 h. The precipitated polymer was collected by filtration and was successively boiled for 1 h in both 100 ml of ethanol and 100 ml of acetone. The solid was again filtered and was dried in a vacuum oven at 60° C. for 4 h and then 120° C. for 16 h (Yield=90%). $MW_w$=85,000, 5% wt. loss by TGA=444° C.; glass transition temperature=159° C.; intrinsic viscosity= 1.16 (40° C./0.05M lithium bromide/NMP).

EXAMPLE 14

Copolymer of 2,5-dichlorobenzophenone (50%) and 4,3'-dichlorobenzanilide (50%)

A 100 ml, round-bottomed flask was charged with of 0.533 g of bis(triphenylphosphine) nickel chloride, 0.64 g of sodium iodide, 2.678 g of triphenylphosphine, 2.70 g of activated zinc dust, 3.752 g of 2,5-dichlorobenzophenone, 3.976 g of 4,3'-dichlorobenzanilide, and 41 ml of anhydrous N-methylpyrolidone (NMP). The flask was fitted with a nitrogen inlet valve and the mixture was stirred under nitrogen at 65° C. for 16 h. The polymer dope was coagulated in 250 ml of a 10% hydrogen chloride/ethanol solution, and the resulting solution was allowed to stir for 4 h. The precipitated polymer was collected by filtration and was successively boiled for 1 h in both 100 ml of ethanol and 100 ml of acetone. The solid was again filtered and was dried in a vacuum oven at 60° C. for 4 h and then 120° C. for 16 h (Yield=93%). $MW_w$=40,500.

EXAMPLE 15

Copolymer of 2,5-dichlorobenzophenone (50%), 1,4-dichlorobenzene (35%), and 3,3'-dichlorobenzanilide (15%)

A 100 ml, round-bottomed flask was charged with of 0.533 g of bis(triphenylphosphine) nickel chloride, 0.64 g of sodium iodide, 2.678 g of triphenylphosphine, 2.70 g of activated zinc dust, 3.752 g of 2,5-dichlorobenzophenone, 1.537 g of 1,4-dichlorobenzene, 1.193 g of 3,3'-dichlorobenzanilide, and 41 ml of anhydrous N-methylpyrolidone (NMP). The flask was fitted with a nitrogen inlet valve and the mixture was stirred under nitrogen at 65° C. for 16 h. The polymer dope was coagulated in 250 ml of a 10% hydrogen chloride/ethanol solution, and the resulting solution was allowed to stir for 4 h. The precipitated polymer was collected by filtration and was successively washed with 100 ml of hot ethanol and then 100 ml of hot acetone. The solid was again filtered and was dried in a vacuum oven at 60° C. for 4 h and then 165° C. for 12 h (Yield=88%). $MW_w$=47,200.

EXAMPLE 16

Copolymer of 2,5-dichlorobenzophenone (90%), 4,4'-di(4-chlorobenzoyl) diphenylether (10%)

A 250 ml, round-bottomed flask was charged with of 1.998 g of bis(triphenylphosphine) nickel chloride, 2.399 g of sodium iodide, 10.00 g of triphenylphosphine, 10.12 g of activated zinc dust, 25.32 g of 2,5-dichlorobenzophenone, 5.000 g of 4,4'-di(4-chlorobenzoyl) diphenylether, and 153 ml of anhydrous N-methylpyrolidone (NMP). The flask was fitted with a nitrogen inlet valve and the mixture was stirred under nitrogen at 65° C. for 16 h. The polymer dope was coagulated in 400 ml of a 10% hydrogen chloride/ethanol solution, and the resulting solution was allowed to stir for 4 h. The precipitated polymer was collected by filtration and was successively washed twice with 100 ml of hot ethanol and once with 100 ml of hot acetone. The solid was again filtered and was dried in a vacuum oven at 60° C. for 4 h and then 170° C. for 16 h (Yield=91%). $MW_w$156,000, 5% wt. loss by TGA=507° C.; glass transition temperature=170° C.; intrinsic viscosity=2.18 (40° C./0.05M lithium bromide/NMP); flexural modulus of compression molded panel= 0.811 MSI; flexural strength of compression molded panel= 37.1 KSI.

EXAMPLE 17

Film Casting and Protonation of Copolymer of Example 2 (The Co-polymer from 3,5-Dichloropyridine and 2,5-Dichlorobenzophenone (3:2))

Polymer resin (4.0 g) was dissolved in formic acid (16 g). NMP (1 g) and chloroform (5 g) was added subsequently. The solution was poured onto a flat glass plate and passed under a blade to give an even film of solution. The film was allowed to stand at room temperature for 2 hours and dried overnight under vacuum at 70° C. The dry film was peeled off the glass plate and protonated in an acid bath containing a solution of sulfuric acid in methanol (1:5, v:v). The protonation was carried out at room temperature for 2.5 days. The film then was then rinsed with methanol and stored in methanol. In a separate experiment, the film was rinsed with water and dried in air.

EXAMPLE 18

Film Casting of Protonated Copolymer from 3,5-Dichloropyridine and 2,5-Dichlorobenzophenone (3:2)

Protonated copolymer film (2.81 g) as prepared in Example 17 was dissolved in NMP (11.2 g) and the solution was used for film casting. The wet film was dried at 50° C. under vacuum overnight followed by drying overnight at 70° C. under vacuum.

EXAMPLE 19

Protonation of Copolymer resin from 3,5-Dichloropyridine and 2,5-Dichlorobenzophenone (3:2)

Copolymer resin (2 g) from Example 17 was suspended in a solution of sulfuric acid in methanol (1:5, v:v) for 4 days. The resulting resin was filtered and rinsed with methanol and dried in air at room temperature. The partially air-dried resin (2.9 g) showed high acidity when wetted with water and tested with pH test paper.

EXAMPLE 20

Activated zinc dust

Activated zinc dust is obtained after 2 washings of commercially available 325 mesh zinc dust with 1M hydrogen chloride in diethyl ether (anhydrous) followed by 2 washings with diethyl ether (anhydrous) and drying in vacuo or under inert atmosphere for several hours at about 100°–200° C. If clumps form during drying the zinc dust is re-sieved to −150 mesh. This material should be used immediately or stored under an inert atmosphere away from oxygen and moisture.

EXAMPLE 21

Copoly-{1,4-(benzoylphenylene)}-{1,3-(5-methoxycarbonylphenylene)}-{1,3-(phenylene)}

A mixture of anhydrous bis(triphenylphosphine) nickel (II) chloride (65 g, 0.099 mole), triphenylphosphine (343 g; 1.5 mole), activated zinc dust (412 g; 6.3 mole), sodium iodide (63 g; 0.42 mole), and 4 liters of dry NMP was prepared in a 50-liter flask under dry nitrogen and stirred for 5 minutes at 50° C. A solution of 2,5-dichlorobenzophenone (1,000 g; 4.0 mole) and 1,3-dichlorobenzene (58 g; 0.39 mole) in 1.6 liters of dry NMP was heated to 50° C. and added to the mixture with stirring. Over a period of about 10 minutes, a solution of methyl-3,5-di-chlorobenzoate (122.5 g; 0.60 mole) in 500 ml of NMP was then slowly added to the mixture with vigorous stirring. The temperature of the reaction mixture was monitored and maintained below 95° C. by applying external cooling as needed. After stirring overnight at 60° C., the viscous polymer solution was diluted with 12 liters of fresh NMP, and residual zinc powder was digested by addition of 600 ml of concentrated hydrochloric acid. After gas evolution ceased and all of the zinc metal appeared to be dissolved, the mixture was poured into methanol to precipitate the polymer. This suspension was filtered and the precipitate continuously extracted for 2 days with methanol and 1 day with acetone and then dried overnight in a vacuum oven at 120° C. to afford 767 g (93% yield) of polymer. $MW_w$=188,593.

EXAMPLE 22

Copoly-{1,4-(benzoylphenylene)}-{1,3-(5-methoxycarbonylphenylene)}-{1,3-(5-(4-phenoxybenzoyl)phenylene)}.

A mixture of anhydrous bis(triphenylphosphine) nickel (II) chloride (12.0 g, 18.3 mmole), triphenylphosphine (70.0 g; 304 mmole), activated zinc dust (90.0 g; 1,380 mmole), sodium iodide (10.0 g, 66.7 mmole), 2,5-dichlorobenzophenone (200 g; 796 mmole), and 3,5-dichloro-4'-phenoxybenzophenone (25 g; 73 mmole) in 700 ml of NMP was prepared in a 3-liter flask under dry nitrogen. A solution of chlorobenzene (3.87 g; 34.4 mmole) in 200 ml NMP was added to the flask and the resulting mixture immediately heated to 50° C. with vigorous stirring. Over the next 15 minutes, a solution of methyl-3,5-dichlorobenzoate (50.0 g; 244 mmole) and 3,5-dichloro-4'-phenoxybenzophenone (25 g; 73 mmole) in 100 ml NMP was added dropwise. The temperature of the reaction mixture was monitored and maintained below 95° C. by applying external cooling as needed. After stirring overnight at 60° C., the viscous polymer solution was diluted with 350 ml of fresh NMP, and residual zinc powder was digested by addition of 40 ml of concentrated hydrochloric acid. After gas evolution ceased and all of the zinc metal appeared to be dissolved, the mixture was poured into 4 liters of ethanol to precipitate the polymer. This suspension was filtered and the precipitate continuously extracted with 1:1 methanol/acetone overnight and then oven dried to afford 184 g (84% yield) of polymer. $MW_w$=104,722.

A compression molded test coupon (3.5"×5.0"×0.125") was prepared from this material by placing 45 g of resin into a mold and heating at 300° C. for 1 hour under 1,000 psi pressure. This sample was cut into test specimens and their flexural properties measured according to the standards of ASTM-D-790 with the following results obtained:

| Specimen | Stress (KSI) | Max. Strain (%) | Modulus (MSI) |
|---|---|---|---|
| 1 | 35.5 | 3.9 | 0.95 |
| 2 | 30.2 | 3.2 | 0.97 |
| 3 | 38.4 | 4.2 | 0.96 |
| 4 | 26.5 | 2.9 | 0.94 |
| 5 | 30.3 | 3.4 | 0.94 |
| Avg. | 32.2 | 3.52 | 0.95 |
| Std. Dev. | 4.7 | 0.53 | 0.01 |

EXAMPLE 23

Copoly-{1,4-(benzoylphenylene)}-{1,3-(5-aminophenylene)}

A mixture of anhydrous bis(triphenylphosphine) nickel (II) chloride (1.4 g, 2.1 mmole), triphenylphosphine (5.5 g; 21 mmole), activated zinc dust (8.0 g; 122 mmole), sodium iodide (1.0 g, 6.7 mmole), 2,5-dichlorobenzophenone (19 g; 76 mmole); 3,5-dichloroaniline (1.4 g; 8.7 mmole), and 90 ml NMP were placed into a 250-ml flask under dry nitrogen. The mixture was heated to 65° C. and stirred vigorously. The temperature of the reaction mixture was monitored and maintained below 100° C. by applying external cooling as needed. After stirring overnight at 75° C., the viscous polymer solution was diluted with 180 ml of fresh NMP, and residual zinc powder was digested by addition of 30 ml of concentrated hydrochloric acid. After gas evolution ceased and all of the zinc metal appeared to be dissolved, 500 ml of isopropanol was added to the solution to precipitate the polymer. This suspension was filtered and the precipitate washed 4 times with boiling methanol and then dried at 120° C. overnight in a vacuum oven to afford 184 g (84% yield) of polymer. $MW_w$=185,246. Nitrogen by elemental analysis: calc. 0.83%; found. 0.98%.

EXAMPLE 24

Copoly-{1,4-(benzoylphenylene)}-{1,3-(5-pyridinyl)}.

A mixture of anhydrous bis(triphenylphosphine) nickel (II) chloride (16.5 g, 25 mmole), triphenylphosphine (75 g; 336 mmole), activated zinc dust (101 g; 1,545 mmole), sodium iodide (13 g, 87 mmole), 2,5-dichlorobenzophenone (240 g; 956 mmole); 3,5-dichloropyridine (35 g; 237 mmole), and 240 ml NMP were placed into a 5-liter flask under dry nitrogen. The mixture was heated to 60° C. and stirred vigorously. The temperature of the reaction mixture was monitored and maintained between 82°–89° C. by applying external cooling as needed. After stirring overnight, the viscous polymer solution was diluted with 900 ml of fresh NMP, and residual zinc powder was digested by addition of 100 ml of concentrated hydrochloric acid. After gas evolution ceased and all of the zinc metal appeared to be dissolved, the mixture was poured into methanol to precipitate the polymer. This suspension was filtered and the precipitate continuously extracted for 2 days with methanol and 1 day with acetone and then dried at 115° C. overnight in a vacuum oven to afford 184 g (97% yield) of polymer. $MW_w$=211,498.

The invention has been described with reference to preferred and exemplary embodiments but is not limited thereto. Those skilled in the art will appreciate that various modifications can be made without departing from the scope of the invention, which is defined by the following claims.

What is claimed is:

1. A co-polymer comprising the general structural formula:

$$(-Ar-/-Y-)_n \quad (1)$$

wherein —Ar— comprises at least 0.1% of the recurring units in (1) and wherein —Ar— is at least one arylene or heteroarylene repeat unit selected from the group consisting of:

$$(A)_x \quad (2)$$

and

-continued

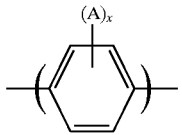
(3)

wherein one to three of the aromatic CH groups in (2) or (3) may be optionally replaced with N;

the number average segment length of the arylene segments is greater than 4, the number average segment length of para-arylene repeat units is between 1 and about 8; the number average segment length of meta-arylene repeat units is greater than 1;

x is 0–4, and the pendant groups (A) are chosen independently from the group consisting of —F, —CN, —CHO, —COR, —CR=NR', —OR, —SR, —SO$_2$R, —OCOR, —CO$_2$R, —NRR', —N=CRR', —NRCOR', —CONRR', and R, where R and R' are selected independently from the group consisting of H, alkyl, substituted alkyl, aryl, substituted aryl, heteroaryl and substituted heteroaryl, and R and R' if present together may form a bridging group;

Y is one or more divalent groups chosen from nil, —Z—, —Z—Ph—, and —Ph—Z—Ph—, where Z is a divalent group chosen from the group consisting of —O—, —S—, —NR—, —O(CO)—, —O(CO$_2$)—, —(CO)NH(CO)—, —NR(CO)—, phthalimide, pyromellitimide, —CO—, —SO—, —SO$_2$—, —P(O)R—, —CH$_2$—, and —CRR'— and where Ph is phenylene (ortho, meta or para); and wherein, if Y is nil, there are at least two different types of —Ar— repeat unit;

where at least 1 of every 100 repeat units has a pendent side group A; and wherein n is greater than about 4.

2. The polymer of claim 1 wherein A is selected from the group consisting of alkyl, aryl, alkyl ketone, aryl ketone, alkoxy, aryloxy, alkylester, arylester, alkylamide and arylamide.

3. The polymer of claim 2 wherein A is selected from the group consisting of acetyl, benzoyl, carbomethoxy, formyl, phenoxy, phenoxybenzoyl, and phenyl.

4. The polymer of claim 1 wherein Y is nil and the polymer has the structure:

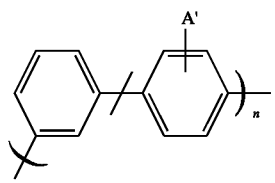

wherein the pendent group A' is chosen independently from the group consisting of —F, —CN, —CHO, —COR, —CR=NR', —OR, —SR, —SO$_2$R, —OCOR, —CO$_2$R, —NRR', —N=CRR', —NRCOR', —CONRR', and R, where R and R' are selected independently from the group consisting of H, alkyl, substituted alkyl, aryl, substituted aryl, heteroaryl and substituted heteroaryl, and wherein R and R' if present together may form a bridging group; and wherein n is greater than about 4.

5. The polymer of claim 4 wherein A is selected from the group consisting of alkyl, aryl, alkyl ketone, aryl ketone, alkoxy, aryloxy, alkylester, arylester, alkylamide and arylamide.

6. The polymer of claim 5 wherein A is selected from the group consisting of acetyl, benzoyl, carbomethoxy, formyl, phenoxy, phenoxybenzoyl, and phenyl.

7. The polymer of claim 4 wherein the meta-phenylene repeat units comprise greater than 10% of the repeat units.

8. The polymer of claim 4 wherein the meta-phenylene repeat units comprise greater than 20% of the repeat units.

9. The polymer of claim 4 wherein the meta-phenylene repeat units comprise greater than 50% of the repeat units.

10. The polymer of claim 1 wherein Y is nil and the polymer has the structure:

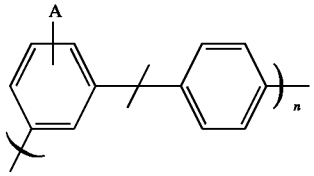

11. The polymer of claim 1 wherein Y is nil and the polymer has the structural formula:

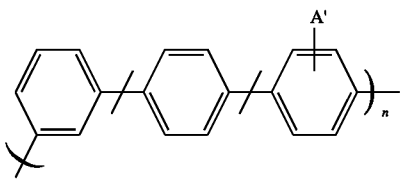

wherein the pendant groups A' are chosen independently from the group consisting of —F, —CN, —CHO, —COR, —CR=NR', —OR, —SR, —SO$_2$R, —OCOR, —CO$_2$R, —NRR', —N=CRR', —NRCOR', —CONRR', and R, where R and R' are selected independently from the group consisting of H, alkyl, substituted alkyl, aryl, substituted aryl, heteroaryl and substituted heteroaryl, and wherein R and R' if present together may form a bridging group; and n is greater than 4.

12. The polymer of claim 11 wherein A' is selected from the group consisting of alkyl, aryl, alkyl ketone, aryl ketone, alkoxy, aryloxy, alkylester, arylester, alkylamide and arylamide.

13. The polymer of claim 11 wherein A' is selected from the group consisting of acetyl, benzoyl, carbomethoxy, formyl, phenoxy, phenoxybenzoyl, and phenyl.

14. The polymer of claim 11 wherein the meta-arylene repeat units comprise greater than 40% of the repeat units.

15. The polymer of claim 1 wherein Y is nil and the polymer has the structure:

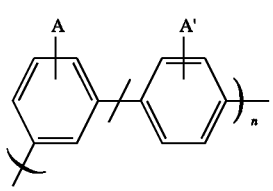

the pendant groups A and A' are chosen independently from the group consisting of —F, —CN, —CHO, —COR, —CR=NR', —OR, —SR, —SO$_2$R, —OCOR, —CO$_2$R, —NRR', —N=CRR', —NRCOR', —CONRR', and R, where R and R' are selected independently from the group consisting of H, alkyl, substituted alkyl, aryl, substituted aryl, heteroaryl, and substituted heteroaryl, and wherein R and R' if present together may form a bridging group; and n is greater than 4.

16. The polymer of claim 1 wherein Y is nil and the polymer has the structure:

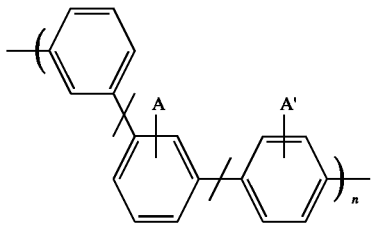

the pendant groups A and A' are chosen independently from the group consisting of —F, —CN, —CHO, —COR, —CR=NR', —OR, —SR, —SO₂R, —OCOR, —CO₂R, —NRR', —N=CRR', —NRCOR', —CONRR', and R, where R and R' are selected independently from the group consisting of H, alkyl, substituted alkyl, aryl, substituted aryl, heteroaryl and substituted heteroaryl, and wherein R and R' if present together may form a bridging group; and n is greater than 4.

17. The polymer of claim 16 wherein A is methoxycarbonyl and A' is benzoyl.

18. The polymer of claim 1 wherein the polymer is a block co-polymer and the repeat units Y form oligomeric or polymeric segments selected from the group consisting of polyamide, polyarylate, polyaryleneoxide, polycarbonate, polydimethylsiloxane, polyester, polyetherketone, polyphenylene, substituted polyphenylene, polyphenylenesulfide, and polystyrene.

19. The polymer of claim 18 wherein —Ar— is

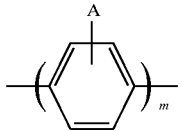

and the number average segment length m is less than about 8.

20. The polymer of claim 19 wherein less than 50% of the repeat units are —Ar— repeat units.

21. The polymer of claim 18 wherein —Ar— is

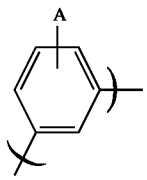

22. The polymer of claim 1 wherein the repeat units Y form a block selected from the group consisting of -(phenylene-CONH-phenylene-NHCO)-phenylene, -(phenylene-CONH-phenylene)-, -(phenylene-COO-phenylene-OCO)-phenylene-, -(phenylene-carbonyl)-phenylene-, and -(phenylene-carbonyl-phenylene-oxo-phenylene-carbonyl-phenylene)-.

23. The polymer of claim 1 wherein the repeat units Y form a block selected from the group consisting of -(phenylene-CONH-phenylene-NHCO)$_m$-phenylene, -(phenylene-CONH)$_m$-phenylene-, -(phenylene-COO-phenylene-OCO)$_m$-phenylene-, -(phenylene-carbonyl)$_m$-phenylene-, and -(phenylene-carbonate-phenylene-2,2-isopropylidene-carbonate)$_m$-phenylene-.

24. The polymer of claim 1 wherein Y has the structure —Ph—Z—Ph— where Z is a divalent group chosen from the group consisting of —(CO)NH—, —(CO)O—, —C(=NC₆H₅)—, —(CO)—; and —SO₂—.

25. The polymer of claim 1 wherein Y has the structure —Ph—Z—Ph— where Z is a divalent group chosen from the group consisting of —(CO)OPh'O(CO)—, —(CO)OPh'C(CH₃)₂Ph'O(CO)—, —(CO)Ph'OPh'(CO)—, and

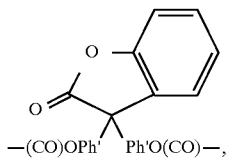

—(CO)OPh'   Ph'O(CO)—, wherein Ph' is 1,2-, 1,3-, or 1,4-phenylene.

26. The polymer of claim 1 wherein at least one arylene repeat unit —Ar— is a N containing heteroarylene.

27. A polymeric composition comprising the polymer of claim 26 and an acid.

28. The polymer of claim 1 wherein the polymer has the structural formula:

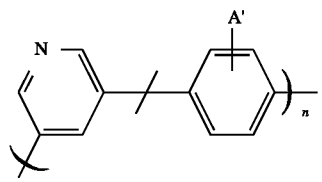

29. The polymer of claim 28 wherein A is selected from the group consisting of acetyl, benzoyl, carbomethoxy, formyl, phenoxy, phenoxybenzoyl, and phenyl.

30. A polymeric composition comprising the polymer of claim 28 and an acid.

31. The composition of claim 30 wherein said acid is selected from the group consisting of acetic, formic, hydrobromic, hydrochloric, hydrofluoric, hydriodic, methane sulfonic, trifluoromethanesulfonic, nitric, perchloric, phosphoric, polyphosphoric, sulfuric, sulfurous, toluenesulfonic, and trifluoroacetic.

32. A process for preparing the composition of claim 1 wherein an oligomeric or polymeric polyphenylene of structure:

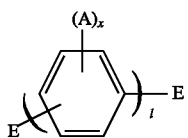

is allowed to react with a complementary difunctional monomer E'—(Y)$_m$—E' where E and E' are complementary reactive groups selected from the group consisting of reactive groups which react to form one or more divalent groups chosen from —Z—, —Z—Ph—, and —Ph—Z—Ph—, where Z is a divalent group chosen from the group consisting of —O—, —S—, —NR—, —O(CO)—, —O(CO₂)—, —(CO)NH(CO)—, —NR(CO)—, phthalimide, pyromellitimide, —CO—, —SO—, —SO₂—, —P(O)R—, —CH₂—, and —CRR'— and where Ph is phenylene (ortho, meta or para); and wherein 1 is greater than 1.

33. The process of claim 32 wherein E is selected from the group consisting of acid chloride, amine aryl alcohol, aryl amine, aryl acid chloride, aryl carboxylic acid, arylfluoride, carboxylic acid, epoxide, fluoride, hydroxy, isocyanate, and silyl chloride.

34. The process of claim 32 wherein E' is selected from the group consisting of acid chloride, amine, aryl alcohol, aryl amine, aryl acid chloride, aryl carboxylic acid, arylfluoride, carboxylic acid, epoxide, fluoride, hydroxy, isocyanate, and silyl chloride.

35. The process of claim 32 wherein E is selected from the group consisting of aryl fluoride, and fluoride and E'-(—Y—)$_m$—E' is an anion of HO—(—Y—)$_m$—OH.

36. The process of claim 32 wherein E is selected from the group consisting of acid chloride, aryl acid chloride, aryl carboxylic acid, carboxylic acid and E' is selected from the group consisting of hydroxy, and amine.

37. The process of claim 32 wherein E is selected from the group consisting of amine, aryl alcohol, aryl amine, and hydroxy and E' is selected from the group consisting of acid chloride, carboxylic acid, epoxide, isocyanate, and silyl chloride.

38. The process of claim 32 wherein 1 is 1.

39. The process of claim 32 wherein 1 is between 2 and 200.

40. The process of claim 32 wherein 1 is between 1 and 10 and m is between 1 and 100.

41. A process for the preparation of the polymer of claim 1 comprising, polymerizing by nickel catalyzed reductive coupling of one or more monomers selected from the group consisting of:

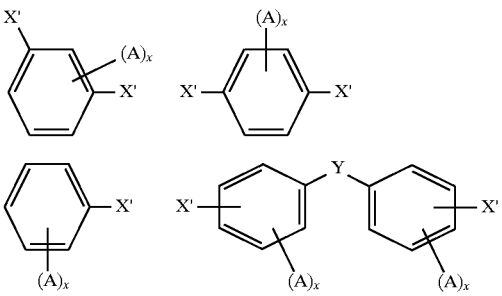

where X' is chloro, bromo, iodo or sulfonate.

* * * * *

UNITED STATES PATENT AND TRADEMARK OFFICE
CERTIFICATE OF CORRECTION

PATENT NO. : 5,886,130
DATED : March 23, 1999
INVENTOR(S) : Mark S. Trimmer; Ying Wang;
Matthew L. Marrocco III; Virgil J. Lee It is certified that error appears in the above-identified patent and that said Letters Patent is hereby corrected as shown below:

On the title Page, Item [56] References Cited, under "References Cited" after "FOREIGN PATENT DOCUMENTS" insert the following:

--            OTHER DOCUMENTS

BALLARD, ET AL., "Biotech route to Polyphenylene," J. Chem. Soc., Chem. Commun., 954 (1983).

BALLAUFF, "Rigid Rod Polymers Having Flexible Side Chains. 1. Thermotropic Poly (1,4-phenylene 2,5-dialkoxyterephthalate)s," Makromol. Chem., Rapid Commun., vol. 7, pp. 407-414 (1986).

BRAHAM, ET AL., "Polyphenylenes vis Bis (2-pyrones) and Diethynylbenzenes. The Effect of m- and p-Phenylene Units in the Chain," Macromolecules, vol. 11, No. 2, 343, March-April 1978.

CHOU, ET AL., "Composites," Scientific American, October 1986, pp. 193-202.

COLON, ET AL, "Coupling of Aryl Chlorides by Nickel and Reducing Metals," J. Org. Chem., 51, 2627-2637 (1986).

HWANG, ET AL., "Composites on a Molecular Level: Phase Relationships, Processing, and Properties," J. Macromolecules Sci.-Phys., B22(2), 231-275 (1983).

HWANG, ET AL., "Molecular Composites of Rigid Rod Poly-P-Phenylenebenzobisthiazole (PPBT) in Thermoplastic Matrices," Organic Coatings and Applied Poly Science Proceedings, vol. 48, pp. 929-933 (1983).

UNITED STATES PATENT AND TRADEMARK OFFICE
CERTIFICATE OF CORRECTION

PATENT NO. : 5,886,130
DATED : March 23, 1999
INVENTOR(S) : Mark S. Trimmer; Ying Wang;
Matthew L. Marrocco III; Virgil J. Lee It is certified that error appears in the above-identified patent and that said Letters Patent is hereby corrected as shown below:

HWANG, ET AL., "Solution Processing and Properties of Molecular Composite Fibers and Films," Polymer Engineering and Science, Mid-October 1983, vol. 23, No. 14, pp. 784-788.
JONES, ET AL., "Polymerization of Aromatic Nuclei, XXVI. Poly (p-phenylene) : Friedel-Crafts Alkylation, Molecular Weight, and Propagation Mechanism," J. Polym. Sci., Polym. Chem. Ed., 19 89 (1981).
KALLITIS, ET AL., "Synthesis and Characterization of Soluble Aromatic Polyesters Containing Oligiophenyl Moieties in the Main Chain, Macromolecules, 27, 4509-4515 (1994).
KALLITIS, ET AL., "Synthesis of Telechelic Poly (p-phenylene) derivatives, Makromol. Chem. 193, 1021-1029 (1992).
LEBERRE, ET AL, "Electrochemical Polymerization of Para-dialkoxybenzenes. Part 1. Anodic Oxidation of Para-dimethoxybenzene in Dry Acetronitrile," J. Electroanal. Chem., 218, 173 (1987).
LIOGON'KII, ET AL., Chem. Abs, 96:7293p, 1982.
MARUYAMA, ET AL., "Preparation and Properties of Poly (methylpyridine-2,5-diyl)s," Chemistry Letters, 643-646 (1992).
MARVEL, ET AL., "Preparation and Aromatization of Poly-1,3-cyclohexadine," JACS, 81, 448 (1959).
MATNISHYAN, ET AL., "The Effect of Various Factors on the Synthesis of Polyarylenequinones," *Vysokomol. soyed.*, A13: No. 5, 1009-1017, May 1971.
MEZHIKOVSKII, ET AL., Chem. Abs., 78:98152j, 1973.

UNITED STATES PATENT AND TRADEMARK OFFICE
CERTIFICATE OF CORRECTION

PATENT NO. : 5,886,130
DATED : March 23, 1999
INVENTOR(S) : Mark S. Trimmer; Ying Wang; Matthew L. Marrocco III; Virgil J. Lee It is certified that error appears in the above-identified patent and that said Letters Patent is hereby corrected as shown below:

English-language version of 78:98152j, MEZHIKOVSKII, ET AL., "Thermal and Thermo-Oxidative Degradation of Polysulphophenylenequinonones," *Vysokomol. soyed.*, A14:
MUKAMAL, ET AL., "Diels-Alder Polymers. III. Polymers Containing Phenylated Phenylene Units," Journal of Polymer Science: Part A-1, vol. 5, 2721-2729 (1967), No. 11, 2397-2404, November 1972.
NOLL, ET AL., "Poly(phenyl-1,4-phenylene), A Temperature-resistant, Soluble, and Melt-processable Derivative of Poly(p-phenylene), "Makromol. chem., Rapid Commun. 11, 485-493 (1990).
REHAHN, ET AL., "A High-Yield Route to 2,5-Di-n-alkyl-1,4-benzenedicarboxylic Acids," Synthesis, 386-388 (1988).
REHAN, ET. AL., "Soluble Poly (para-phenylene)s. 1. Extension of the Yamamoto Synthesis to Dibromobenzenes Substituted with Flexible Side Chains," *Polymer* (June 1989), pp. 1054-1059.
REHAHN, ET AL., "Soluble poly (para-phenylene)s. 2. Improved synthesis of poly (para-2,5-di-n-hexylphenylene) via Pd-catalyzed coupling of 4-bromo-2,5-di-n-hexylbenzeneboronic acid." Polymer, 30, 1060-1062 (1989).
REHAHN, ET AL., "Soluble Poly (para-phenylene)s, 3[a)], Makromol. Chem. 191,1991-2003 (1990).
REINHARDT, ET AL., "Pendant Oxy and Thioarylene Aromatic Heterocyclic Polymers," Polym. Prepr. (American Chemical Society, Division of Polymer Chemistry), 23 (2), 119 (1982).

UNITED STATES PATENT AND TRADEMARK OFFICE
CERTIFICATE OF CORRECTION

PATENT NO. : 5,886,130
DATED : March 23, 1999
INVENTOR(S) : Mark S. Trimmer; Ying Wang;
Matthew L. Marrocco III; Virgil J. Lee It is certified that error appears in the above-identified patent and that said Letters Patent is hereby corrected as shown below:

SATOH, ET AL., "Properties of Highly Conducting Poly (p-Phenylene) Film Prepared by an Electrochemical Method," Polymer Communications, 26, 396 (1985).
SCHILLING, ET AL., "Diels-Alder Polymerizations. VI. Phenylated Polyphenylenes from Bis-2-pyrones and p-Diethynylbenzene," Macromolecules, vol. 2, No. 1, January-February 1969.
STILLE, ET AL., "Diels-Alder Polymers: Polyphenylenes Containing Alternating Phenylene and Triphenylphenylene Units," Journal of Polymer Science, Part B-7, 525 (1969).
STILLE, ET AL., "Poly(p-phenylene)," Macromolecules, 4, 515 (1971).
TOUR, J.M., Soluble Oligo- and Polyphenylenes, Advanced Materials, 6, 190-198 (1994).
TREVILLYAN, Chem. Abs., 86:139404d (1977).
WALLOW, ET AL., "Aqueous Synthesis of Soluble Rigid-Chain Polymers. An Ionic Poly (p-phenylene) Analog." Polymer Preprints, vol 32, No. 3 (1991).
WALLOW, ET AL., Chem. Abs., 115:280696z (1991).
WALLOW, ET AL., Chem. Abs., 115:136902w (1991).
WELLMAN, ET AL., "Rodlike Polymer Reinforcement of an Amorphous Polymer Matrix, AB-PBI/PBT," CS Organic Cost. Plast. Chem., 93, 783 (1980).
YAMAMOTO, ET AL., "A Novel Type of Polycondensation Utilizing Transition Metal-Catalyzed C-C Coupling. I. Preparation of Thermostable Polyphenylene Type Polymers," Bulletin of the Chemical Society, Vol. 51, No. 7, July 1978.

UNITED STATES PATENT AND TRADEMARK OFFICE
CERTIFICATE OF CORRECTION

PATENT NO. : 5,886,130
DATED : March 23, 1999
INVENTOR(S) : Mark S. Trimmer; Ying Wang; Matthew L. Marrocco III; Virgil J. Lee It is certified that error appears in the above-identified patent and that said Letters Patent is hereby corrected as shown below:

YAMAMOTO, ET AL., "A Soluble Poly(arylene) with Large Degree of Depolarization, Chemistry Letters, 153-154 (1988).
ZEMBAYASHI, ET AL., "Nickel Phosphine Complex-Catalyzed Homo Coupling of Aryl Halides in the Presence of Zinc Powder," Tetrahedron Letters, 4089-4092 (1977).
*ADVANCED ORGANIC CHEMISTRY* (March), 2nd Edition, published 1977, pp. 386-387.
CONFERENCE REPORT, "Specialty Polymers," - 3rd International Conference on New Polymeric Materials, September 13-15, 1988.
SALES BROCHURE entitled "Polyphenylene Precursor PPP1," Imperial Chemical Industries PLC, Runcorn, Cheshire, England (4 pages). --

Column 4, line 61, replace "trifluoroethyliden-2,2'-diyl" with
-- trifluoroethylidene-2,2'diyl --.
Column 5, line 29, replace "4,4'-dihyroxybipyhenyl" with
-- 4,4'-dihydroxybiphenyl --.
Column 5, line 44, replace "sacinic" with -- succinic --.
Column 9, line 46, replace "prepared y" with -- prepared by --.
Column 10, line 2, replace that portion of the compound reading "—Ar'"—"
with -- —Ar"— --.
Column 11, line 56, replace "unit" with -- units --.
Column 14, line 55, replace "co-polymerization" with -- Co-polymerization --.
Column 16, lines 2,41,60, after "mmol)," delete ")," (all occurrences).
Column 16, lines 4,23,43,62, replace "redish" with -- reddish -- (all occurrences).
Column 17, lines 14,35, after "mmol)," delete ")," (both occurrences).

UNITED STATES PATENT AND TRADEMARK OFFICE
CERTIFICATE OF CORRECTION

PATENT NO. : 5,886,130
DATED : March 23, 1999
INVENTOR(S) : Mark S. Trimmer; Ying Wang; Matthew L. Marrocco III; Virgil J. Lee It is certified that error appears in the above-identified patent and that said Letters Patent is hereby corrected as shown below:

Column 17, lines 16,37, replace "redish" with -- reddish -- (both occurrences).
Column 17, line 33, replace "0.5.23" with -- 0.523 --.
Column 17, line 51, after "with" delete "of".
Column 18, lines 11,36, 58 after "with" delete "of" (all occurrences).
Column 18, lines 16,41,63, replace "N-methylpyrolidone" with
-- N-methylpyrrolidone -- (all occurrences).
Column 19, lines 12,34, after "with"delete"of" (both occurrences).
Column 19, lines 18,39, replace "N-methylpyrolidone" with
-- N-methylpyrrolidone -- (both occurrences).
Column 19, line 47, replace "$MW_w 156,000$" with -- $MW_w=156,000$ --.
Column 20, line 3, replace "film then was then" with -- film was then --.
Column 26, line 21, replace "a N" with -- an N --.

Signed and Sealed this

Twenty-second Day of August, 2000

Q. TODD DICKINSON

*Attest:*

*Attesting Officer*    *Director of Patents and Trademarks*

UNITED STATES PATENT AND TRADEMARK OFFICE
CERTIFICATE OF CORRECTION

PATENT NO. : 5,886,130
DATED : March 23, 1999
INVENTOR(S) : Mark S. Trimmer et al.

Page 1 of 1

It is certified that error appears in the above-identified patent and that said Letters Patent is hereby corrected as shown below:

<u>Column 1,</u>
Line 2, after "POLYPHENYLENE CO-POLYMERS" and before "FIELD OF INVENTION" insert the following :

-- This invention was made with government support under the Department of the Navy Contract/Grant No. N00014-93-C-0190 awarded by the Navy. The United States government has certain rights in this invention. --.

Signed and Sealed this

Ninth Day of May, 2006

JON W. DUDAS
*Director of the United States Patent and Trademark Office*